United States Patent
Dias et al.

(10) Patent No.: US 7,085,286 B2
(45) Date of Patent: Aug. 1, 2006

(54) STATEFUL BUSINESS-TO-BUSINESS PROTOCOL EXCHANGE

(75) Inventors: Daniel M. Dias, Mohegan Lake, NY (US); Stewart L. Palmer, New York, NY (US); Hidayatullah Shaikh, Mohegan Lake, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 09/896,201

(22) Filed: Jun. 29, 2001

(65) Prior Publication Data

US 2003/0002526 A1 Jan. 2, 2003

(51) Int. Cl.
*H04J 3/16* (2006.01)

(52) U.S. Cl. .................................... 370/466; 709/230
(58) Field of Classification Search ................ 370/389, 370/400, 401, 465, 466, 467; 709/230, 346
See application file for complete search history.

(56) References Cited

U.S. PATENT DOCUMENTS

| | | | |
|---|---|---|---|
| 6,757,731 B1 * | 6/2004 | Barnes et al. ............... | 709/227 |
| 6,772,413 B1 * | 8/2004 | Kuznetsov ................... | 717/136 |
| 2001/0056504 A1 * | 12/2001 | Kuznetsov ................... | 709/310 |
| 2002/0120776 A1 * | 8/2002 | Eggebraaten et al. ....... | 709/246 |
| 2002/0147823 A1 * | 10/2002 | Healy .......................... | 709/230 |
| 2002/0165975 A1 * | 11/2002 | Abbott ......................... | 709/230 |
| 2002/0174034 A1 * | 11/2002 | Au et al. ...................... | 705/27 |

* cited by examiner

*Primary Examiner*—Bob A. Phunkulh
(74) *Attorney, Agent, or Firm*—Ryan, Mason & Lewis, LLP (57) ABSTRACT

A method of communicating between two business entities, each of the business entities utilizing a different communication protocol, wherein a business conversation is established between the entities, comprises the steps of: providing a business-to-business (B2B) protocol exchange for facilitating communications between the business entities, the B2B protocol exchange being operatively connected to the business entities. The method further includes the step of receiving, at the B2B protocol exchange, a message from one of the business entities in a first communication protocol, translating the received message in the first communication protocol into a translated message in a second protocol used by another of the business entities and sending the translated message to the other business entity. In this manner, the present invention provides a framework for facilitating communication between two business entities implemented using different communication protocols.

19 Claims, 8 Drawing Sheets

STATEFUL BUSINESS-TO-BUSINESS PROTOCOL EXCHANGE

FIELD OF THE INVENTION

The present invention relates generally to electronic commerce systems, and more particularly relates to a business-to-business protocol exchange for connecting multiple electronic marketplaces, buyers and/or suppliers to each other using different communications protocols.

BACKGROUND OF THE INVENTION

With the increasing popularity of the Internet (e.g., World Wide Web), businesses, including commercial enterprises, government and academia, can communicate with one another, for example, through electronic procurement (e-procurement) systems or electronic marketplaces (e-marketplaces). Many such marketplaces and/or trading networks have emerged and are commercially available, for example, WebSphere Commerce Suite Marketplace Edition (trademark of IBM Corporation), Ariba Buyer and Ariba Marketplace (trademarks of Ariba, Inc.), Market Set (trademark of SAPMarkets Inc.), and ConnectTrade (trademark of Metiom, Inc.).

Since there is no standard communication protocol which is used for all procurement systems, each of the conventional procurement systems and marketplaces may use different interaction protocols to communicate between buyers, the procurement system or marketplace, and suppliers for browsing catalogs, creating quotes or shopping carts, sending orders, etc. For example, Ariba has defined a punch-out process with messages defined in a Commerce XML (cXML) protocol, Metiom uses an Open Buying on the Internet (OBI) protocol, mySAP utilizes a protocol known as Open Catalog Interface (OCI), and other vendors have defined additional protocols. These protocols are stateful, meaning that data sent in one of the messages between the entities is used in a subsequent interchange between the entities. More specifically, the communications between the entities typically occurs in a long running conversation comprised of a sequence of messages, with the information contained in one message in the conversation being used in the content of later messages.

Presently, in a conventional e-commerce architecture buyers using a given procurement system or marketplace are limited to transacting with suppliers which implement the same protocol as that specified by the given procurement system or marketplace. Therefore, there is a need for a framework which enables buyers utilizing a procurement system or marketplace employing one (stateful) protocol to transact with a supplier or marketplace using another (stateful) protocol.

SUMMARY OF THE INVENTION

The present invention provides techniques for enabling buyers utilizing a procurement system or marketplace employing one stateful protocol to communicate with suppliers using another stateful protocol. The invention includes a business-to-business (B2B) protocol exchange, operatively connected to one or more buyers and suppliers, for translating a message received in one communication protocol into a translated message using one or more different communication protocols, as required by a predetermined recipient of the translated message. The translation of subsequent messages between a buyer and seller may depend on state information provided by previous messages of a conversation between the buyer and the seller.

In one illustrative aspect of the invention, a method of communicating between two business entities, each of the business entities utilizing a different communication protocol, wherein a business conversation is established between the entities, includes providing a B2B protocol exchange for facilitating communications between the business entities, the protocol exchange being operatively connected to the business entities. The method further includes receiving, at the B2B protocol exchange, a message from one of the business entities in a first communication protocol, translating the received message in the first communication protocol into a translated message in a second protocol used by another of the business entities, and sending the translated message to the other business entity.

In another illustrative aspect of the invention, a B2B system is provided which includes a B2B protocol exchange connected to one or more suppliers and at least one of a buyer and a procurement system. The protocol exchange of the present invention enables the buyer and/or procurement system which is communicating in a first protocol to operatively transact with the suppliers which are communicating in a different protocol by translating messages from one another into the protocol used by the particular system.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

Figure 1:
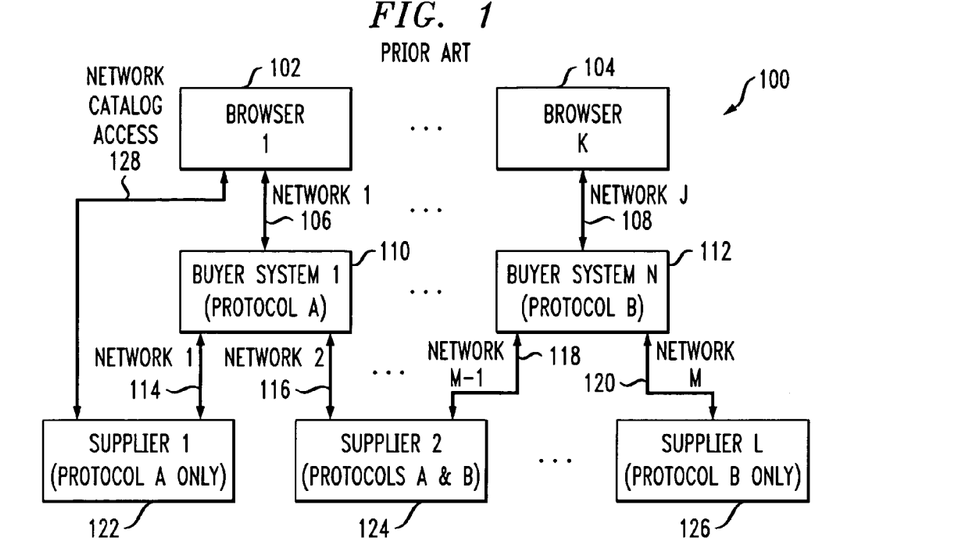
FIG. 1 is a block diagram illustrating a conventional framework in which buyers and sellers transact through different procurement systems and marketplaces.

FIG. 1 illustrates a conventional framework 100 for business-to-business (B2B) transactions. In the conventional framework 100, buyer systems 110, 112 such as procurement systems (e.g., Ariba Buyer/Operating Resource Management System (ORMS)) and marketplaces, execute B2B operations with supplier systems 122, 124, 126, such as Web Commerce Servers (e.g., IBM WebSphere Commerce Suite) and other marketplaces. These operations are typically executed over one or more networks 114, 116, 118, 120 and include transactions including, for example, order placement, catalog shopping, and requests-for-quote (RFQ). The buyer systems 110, 112 typically communicate with users via respective web browsers 102, 104 over a corresponding network 106, 108, respectively. Some operations such as network catalog access may flow directly from browsers to suppliers if a network catalog access path 128 is available (e.g., a firewall from a private intranet to the public internet).

As previously stated, one difficulty with a conventional B2B framework is that there are a number of different buyer-to-supplier protocols presently being used (e.g., Ariba punch-out, Metiom OBI, etc.) or contemplated. Many buyer systems and supplier systems support only a single protocol. Consequently, a buyer system and supplier system that do not support the same protocol cannot communicate with one another using the conventional B2B framework. Although some buyer systems and/or supplier systems may support multiple protocols (e.g., Supplier 2 in FIG. 1), a system which supports multiple protocols adds significantly to the cost and overhead of the overall system. Moreover, it would be difficult to configure the conventional framework to support new protocols as they are brought online due, at least in part, to the fact adding a new protocol to a conventional system already employing a set protocol is difficult.

The present invention will be described herein in the context of a data processing system embodying an illustrative B2B framework for communicating between buyer systems and supplier systems that may be incompatible (i.e., those systems that do not support a common B2B interaction protocol or multiple protocols). It is to be appreciated, however, that the techniques described herein may be applied generally to a wide variety of system configurations for facilitating transactions between buyers and suppliers using disparate procurement systems and marketplaces. The term "network" as used herein is intended to refer generally to any type of communication medium or channel for conveying transmitted information, including a wireless communication link, such as, but not limited to, radio frequency, satellite, microwave, etc., and a dedicated communication connection, such as, but not limited to, telephone, cable, fiber optic, etc.

Figure 2:
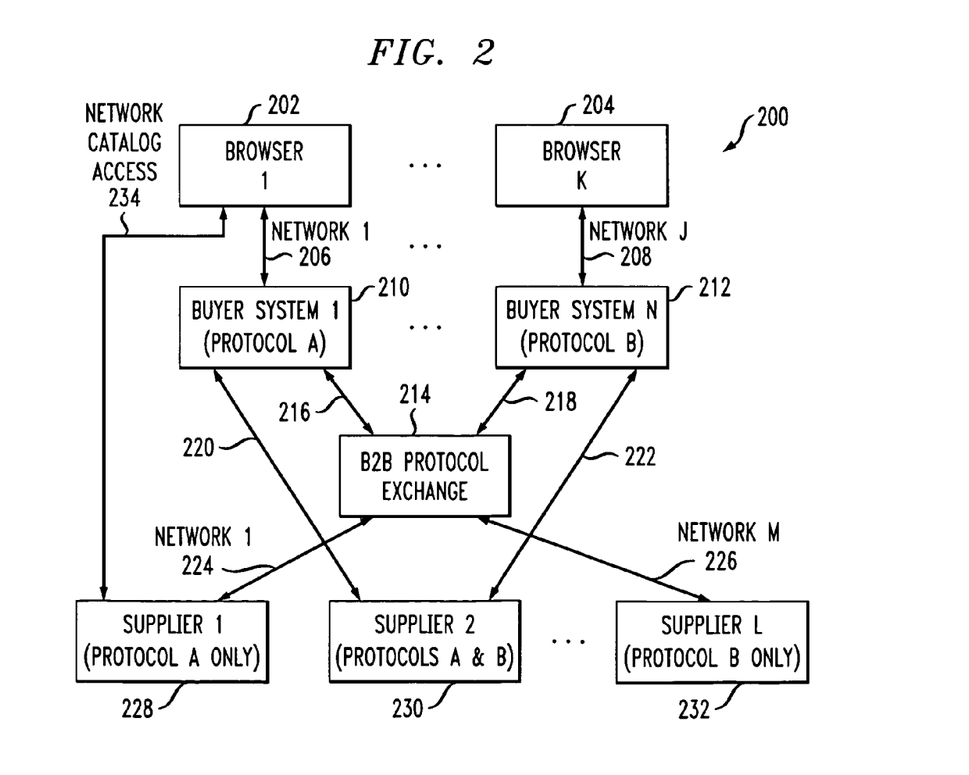
FIG. 2 is a block diagram illustrating a business-to-business (B2B) framework in which buyer systems and supplier systems transact with each other using different protocols via a stateful B2B protocol exchange, in accordance with one aspect of the present invention.

FIG. 2 illustrates a B2B framework 200, formed in accordance with one aspect of the invention. The B2B framework 200 includes one or more browsers 202, 204 connected to one or more buyer systems 210, 212, respectively, via one or more networks 206, 208, respectively. It is to be appreciated that more than one browser may be connected to a single buyer system over the same or different networks. Moreover, buyer system 1 (210) is depicted as communicating with a first protocol (e.g., protocol A) while buyer system N (212) communicates using a second protocol (e.g., protocol B), although the invention similarly contemplates that the buyer systems may communicate using the same protocol. Additional buyer systems may communicate using different protocols.

The B2B framework 200 also includes one or more supplier systems 228, 230, 232. Some of the supplier systems in the B2B framework may support multiple protocols (e.g., supplier system 230), in which case such supplier system can be connected directly to a buyer system communicating using the particular protocol(s) that are supported, for example, via network 220, 222. Other supplier systems (e.g., supplier systems 228, 232), however, which do not support the same protocol as a particular buyer system (e.g., buyer system 212, 210, respectively), cannot be directly connected.

Rather than the buyer systems being directly connected to supplier systems, as in the conventional framework, the B2B framework 200 of the present invention includes a B2B protocol exchange 214. A primary function of the protocol exchange 214 is to operatively translate messages from one protocol (e.g., protocol A) to another protocol (e.g., protocol B). The existence of the protocol exchange 214 is preferably transparent to either the buyer system(s) or the supplier system(s). On the inbound side, which may be defined as data flow from a buyer system (e.g., 210) to the protocol exchange 214, for example, via network 216, 218, the protocol exchange 214 preferably functions as a supplier system which communicates using the same protocol as the buyer system (e.g., protocol A). Likewise, on the outbound side, which may be defined as data flow from the protocol exchange 214 to a supplier system (e.g., 232), for example, via network 224, 226, the protocol exchange 214 functions as a buyer system which communicates using the same protocol as the supplier system (e.g., protocol B). Thus, no modifications to either the buyer system or supplier system protocol are required to use the B2B protocol exchange 214.

The protocol exchange 214 preferably maintains conversational state at least in part to perform the protocol translation function. Some message flows contain references to data contained in previous message flows. For example, a purchase order message may contain a "cookie" which refers to a previous exchange of authentication information (e.g., a user id and password). Without maintaining conversation state, the protocol exchange may not have sufficient context to translate subsequent messages. In addition, as will be described herein below, some protocols require replacement or introduction of information sent in an earlier message of a conversation to be used in translating and in the content of a subsequent message. Furthermore, the protocol exchange 214 may receive asynchronous messages relating to a conversation.

The B2B protocol exchange 214 will be described herein in further detail in the context of conversational B2B interactions for punchout processes used, for example, in B2B network catalog operations. Those skilled in the art will readily appreciate that the methods described for the B2B exchange can be used for other B2B transactions as well as for general stateful conversational processes.

Figure 3:
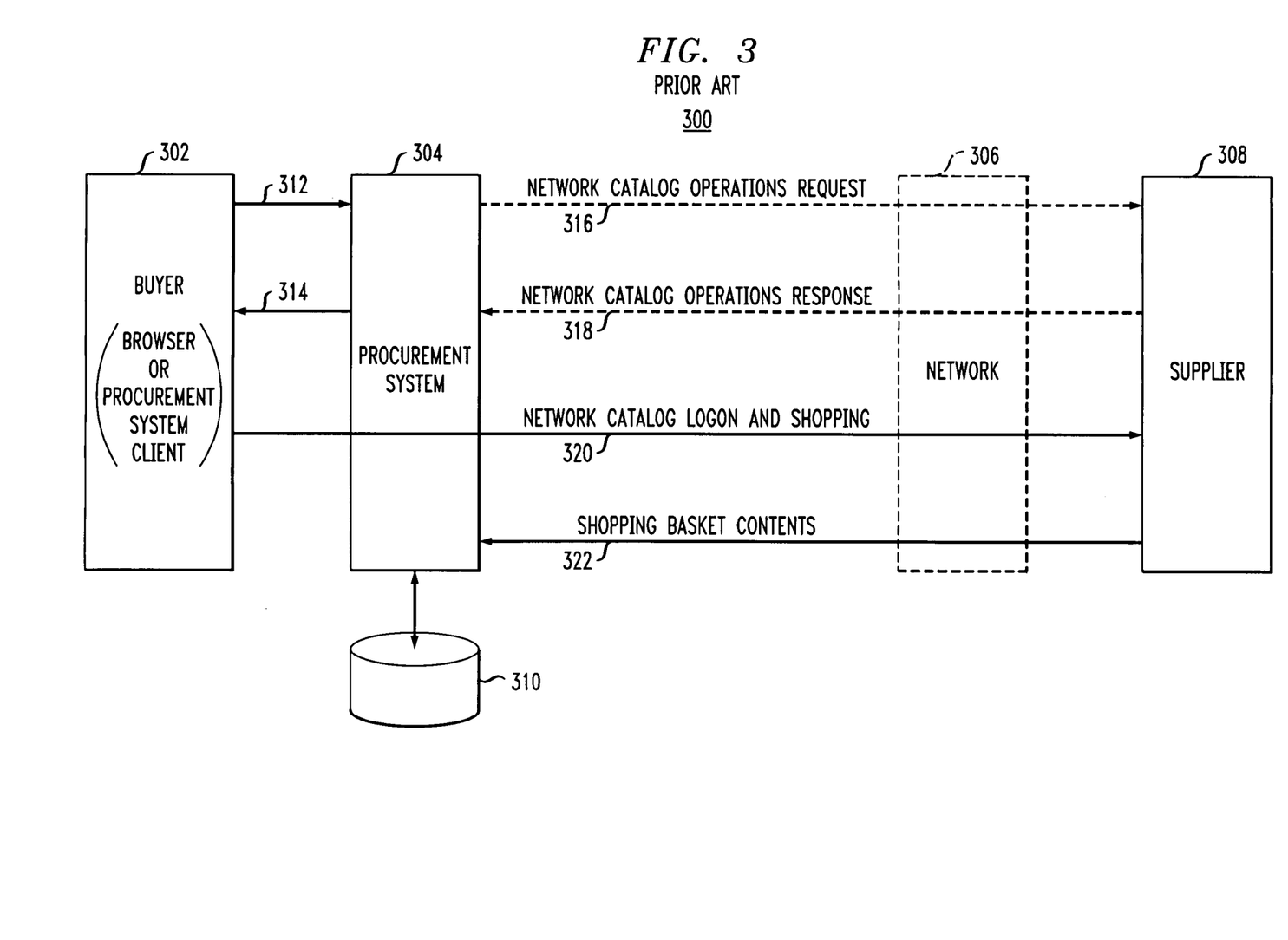
FIG. 3 is a block diagram illustrating information flow for a transaction between a buyer and a supplier using a conventional procurement system or marketplace.

Referring now to FIG. 3, a flow diagram is shown for a communication between a buyer and a supplier using the conventional B2B procurement system or marketplace of FIG. 1 for network catalog operations. In the conventional framework 300, a buyer 302 is a client to a procurement system 304, which may be a Web browser. This is typically used, for example, by the employees of a buying organization to do their B2B shopping. The procurement system 304 keeps track of the employees of the buying organization, the approval work flow, orders placed by buyers, etc. This information is generally stored in a repository 310, which can be a file system or a database. Messages between the procurement system 304 and a supplier 308 typically flow over a network 306, such as the Ariba Network, which keeps track of its buyers and suppliers and handles reliable message delivery. The supplier 308 is often a selling organization's website or a marketplace enabled to handle B2B messages from the procurement system 304.

In the conventional B2B architecture 300, message flow starts with the buyer 302 logging on to the procurement system 304 during step 312. During this step, the buyer 302 selects a desired network supplier 308 at whose website he wants to do his shopping. The procurement system 304 then looks up the catalog Universal Resource Locator (URL) address of the supplier 308 from its repository 310 along with the necessary security credentials. Procurement systems, like Ariba Buyer, obtain the catalog URL address by sending out a catalog operations request to the supplier 308 during step 316, along with the necessary security credentials and cookies. The supplier 308 then responds with a message containing the catalog URL address during step 318. During step 320, the buyer 302 is logged on to the supplier 308 and can do his shopping. The buyer is generally able to store desired items for purchase in a shopping cart or basket. When the buyer is ready to check out, the contents of his shopping cart are transferred to the procurement system 304 during step 322, where a purchase order can be generated and sent back to the supplier 308.

Figure 4:
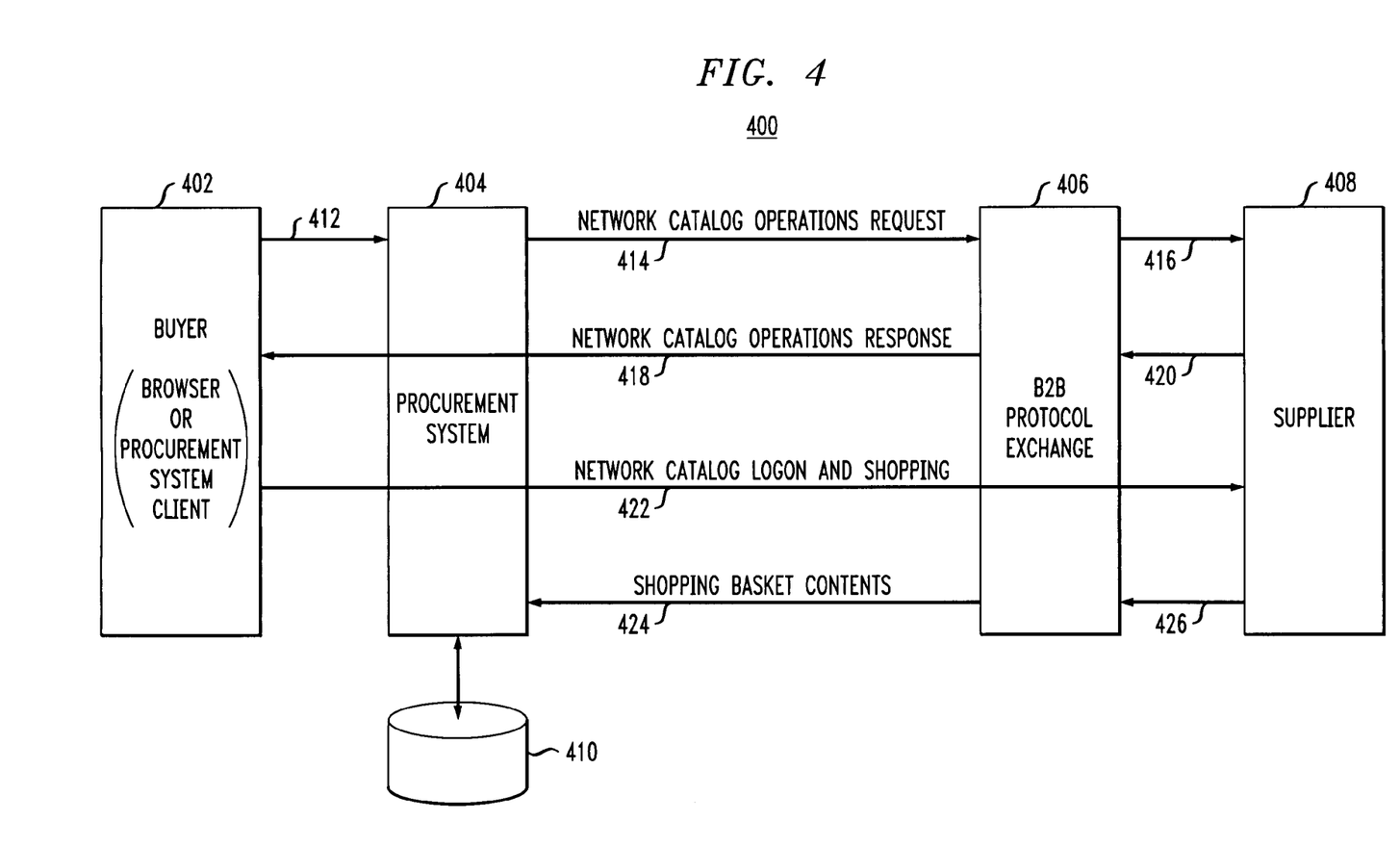
FIG. 4 is a block diagram illustrating information flow between a buyer and a supplier which employ different protocols and transact through a stateful B2B protocol exchange, in accordance with the present invention.

With reference now to FIG. 4, a flow diagram is shown for a communication between a buyer 402 and a supplier 408 using the B2B framework of FIG. 2 for network catalog operations, in accordance with the present invention. In the illustrative B2B framework 400, the buyer 402, which may be, for example, a Web browser, is preferably a client to a procurement system 404. The procurement system 404 preferably keeps track of conversational information which may be used, for example, in translating subsequent messages, and other information, such as the employees of a buying organization, the approval work flow, orders placed by buyers, etc. This information may be stored in memory 410, which can be a file system or a database, or an alternative repository. The term "memory" as used herein is intended to include any fixed or removable storage media, such as, for example, random access memory (RAM), flash memory, hard disk, etc. Procurement system 404 in the illustrative B2B framework 400 uses a different communication protocol from that used by the supplier 408. By way of example only, the procurement system 404 may use a mySAP (trademark of SAPMarkets Inc.) procurement system, while the supplier 408 may be an Ariba (trademark of Ariba, Inc.) supplier which uses an Ariba punchout protocol. Supplier 408 is often a selling organization's website or a marketplace enabled to handle B2B messages from the procurement system 404.

As stated above with regard to FIG. 2, a B2B protocol exchange or gateway 406 is operatively connected between the buyer 402 and/or procurement system 404 and the supplier 408, primarily to translate between the stateful protocols of the buyer and supplier, respectively. Preferably, the protocol exchange 406 maintains information about clients (e.g., buyers) and suppliers, maintains state about client sessions, performs appropriate transformations based on session information and state, etc., and thus performs stateful protocol transformation between buyers and suppliers. For providing secure transactions, one or more firewalls (not specifically shown) may be utilized, preferably included in a path between the buyer 402 and the supplier 408, as will be understood by those skilled in the art. It is to be appreciated that a procurement system employing the same protocol as the supplier may also be used by the invention, in which case no protocol translation need be performed by the protocol exchange 406.

With continued reference to FIG. 4. messages between the buyer 402 and/or procurement system 404 and the protocol exchange 406, or likewise between the protocol exchange 406 and the supplier 408 are preferably transmitted over one or more networks. In the illustrative B2B architecture 400, message flow preferably starts with the buyer 402 logging on to the procurement system 404 during step 412. During this step, the buyer 402 selects a desired network supplier 408 at whose website he wants to do his shopping. The procurement system 404 then preferably looks up the catalog Universal Resource Locator (URL) address of the supplier 408 from its repository 410 along with the necessary security credentials. The procurement system 404 redirects the buyer 402 to a supplier catalog page by sending a catalog operations request, in a first protocol utilized by the procurement system 404, through the B2B protocol exchange 406 during step 414. A translated catalog operations request is then sent to the supplier 408 during step 416 in a second protocol utilized by supplier 408. Some procurement systems, like Ariba Buyer, obtain the catalog URL address by sending out a catalog operations request to the supplier 408, along with the necessary security credentials and cookies, rather than storing such information in a repository 410.

The supplier 408 responds to the catalog operations request by sending a catalog operations response containing, for example, the catalog URL address using the second protocol to the protocol exchange 406 during step 420. A translated catalog operations response is then sent to the buyer 402 during step 418. In this response, the supplier 408 preferably provides enough information for the buyer 402 (e.g., via a browser) to be able to log directly into the supplier 408. During step 422, the buyer 402 is logged into the supplier 408 and can do his shopping. The buyer is generally able to store desired items for purchase in a shopping cart or basket. The shopping basket employed by the present invention may be consistent with a conventional shopping cart. It is to be appreciated that the shopping session preferably occurs directly from the buyer's browser to the supplier, and only the shopping basket is returned to the protocol exchange 406 for translation. When the buyer is ready to check out, the contents of the shopping basket are transferred to the protocol exchange 406, in the second protocol, during step 426. The shopping basket contents are then translated into the first protocol and sent to the procurement system 404 during step 424, where a purchase order may be generated and sent back to the supplier.

Figure 5:
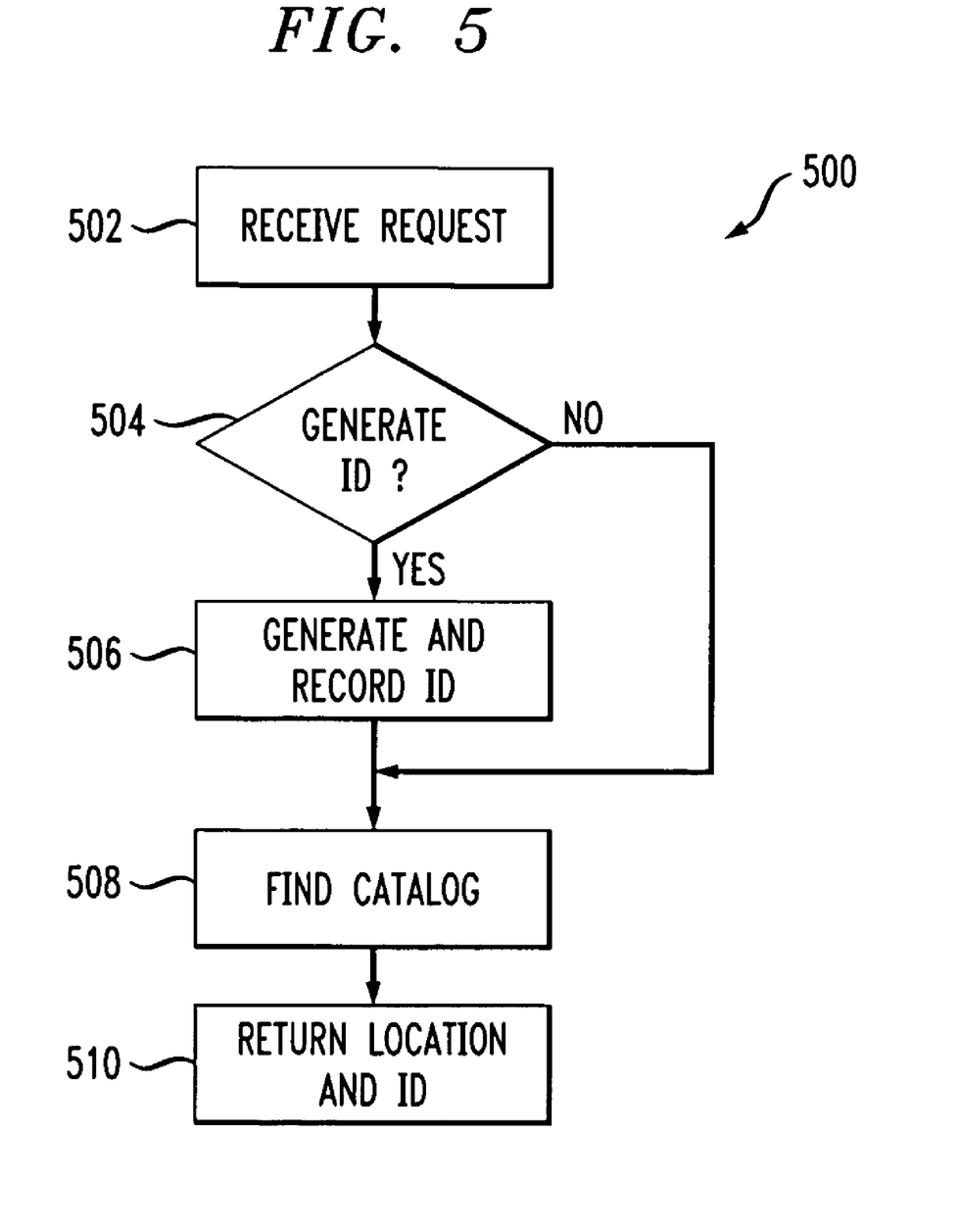
FIG. 5 is a logical flow diagram illustrating a network catalog identification request performed by the B2B protocol exchange of FIG. 4, in accordance with one aspect of the invention.

By way of example only, FIG. 5 depicts a logical flow diagram illustrating a method or procedure 500 of handling a network catalog operations request (e.g., network catalog identification request), register a postback URL (which can be used by the supplier to send the shopping basket back to the procurement system), identify a conversation identifier, etc.) performed by the B2B protocol exchange in accordance with one aspect of the invention. The procedure 500 is depicted herein as a number of functional blocks, each block comprising one or more sub-procedures for implementing a predetermined task(s), or a portion thereof. Preferably, the protocol exchange receives a network catalog identification message or request (e.g., from a buyer or procurement system) in block 502 to determine the location of a desired supplier system catalog. The received request may or may not include information identifying the entity (e.g., buyer or procurement system) making the request and/or the postback URL. It is contemplated that some procurement systems may use multiple requests, or no requests if the location of the supplier catalog is already known. The request may include a conversation identifier generated by the buyer system or it may cause the protocol exchange to generate a conversation identifier. The conversation identifier may be used to identify a specific session between the buyer and supplier systems. This is part of the session state. For example, the conversation identifier may be used to correlate the shopping basket with a network catalog operations request.

After receiving the request, the protocol exchange preferably determines, at block 504, whether or not a conversation identifier needs to be generated. If either the postback URL or the buyer identity have been supplied with the request and the buyer has not supplied a conversation identifier, the protocol exchange preferably generates and records a conversation identifier at block 506 to be returned with the message. The procedures of block 506 may be omitted if the conversation identifier is supplied by the buyer or procurement system, or if a conversation identifier is not used. It is to be appreciated that depending upon the particular protocol employed, the conversation identifier can be generated by either the buyer side or the supplier side. For protocols that do not use conversation identifiers at all, the protocol exchange preferably creates and records the conversation identifier (block 506) and transparently inserts it into the postback URL. The conversation identifier, if present, will be used by the protocol exchange in a subsequent method, as will be described below.

In accordance with the present invention, the protocol exchange uses the information included in the request to determine the location of the desired supplier catalog in block 508. In order to locate the supplier catalog, the protocol exchange may be configured with mapping information which maps between buyers in different protocol domains and suppliers in different protocol domains. In this specific case, the buyer may provide a target supplier in an incoming protocol domain and the protocol exchange converts this to a target supplier identification in an outgoing protocol domain. Once the location of the desired supplier catalog is found, the protocol exchange returns the catalog location and the conversation identifier, if used, by way of a network catalog operations response to the buyer in block 510.

Figure 6A:
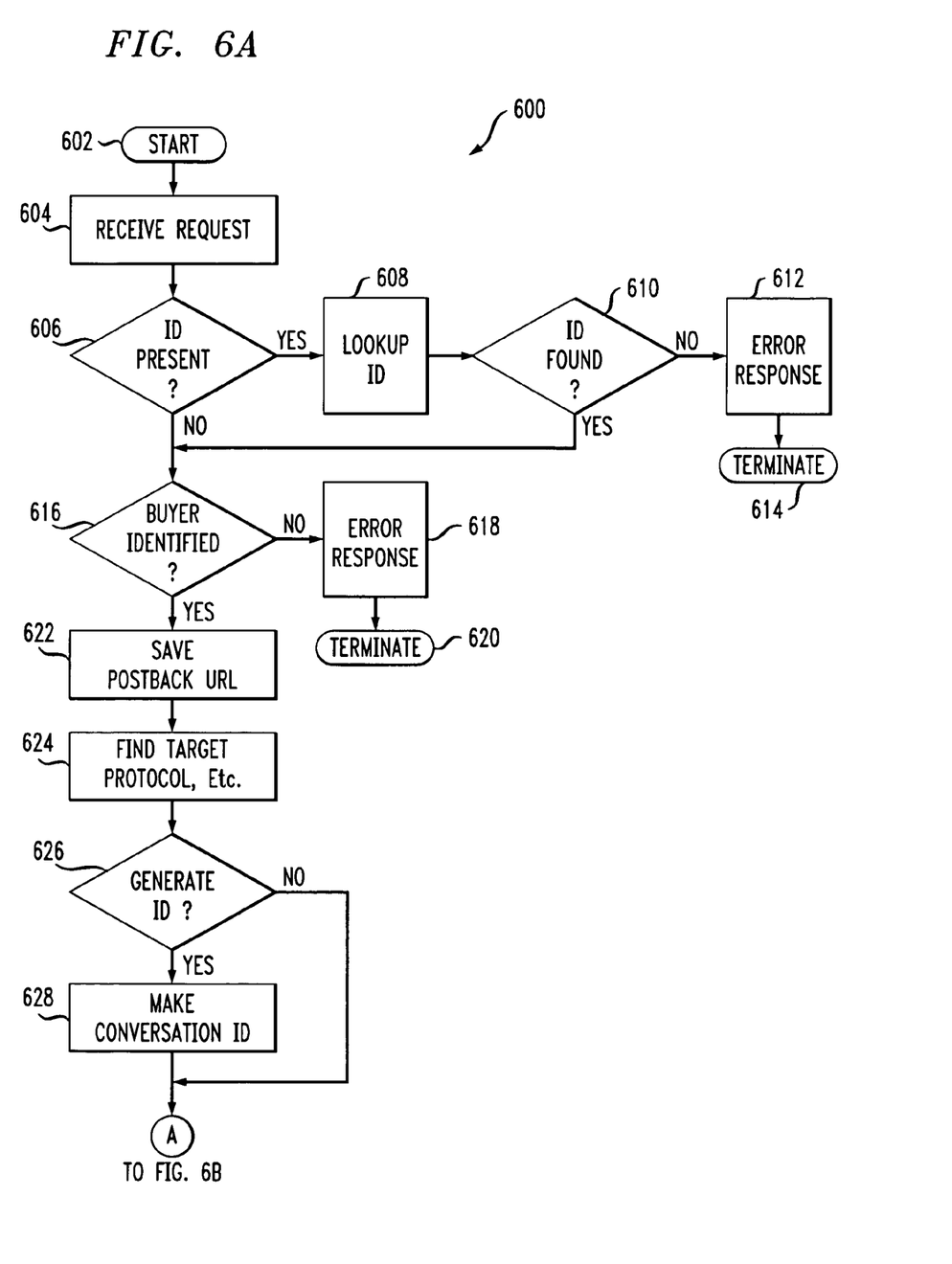
FIGS. 6A and 6B are logical flow diagrams illustrating a network catalog logon performed by the B2B protocol exchange of FIG. 4, in accordance with another aspect of the invention.
Figure 6B:
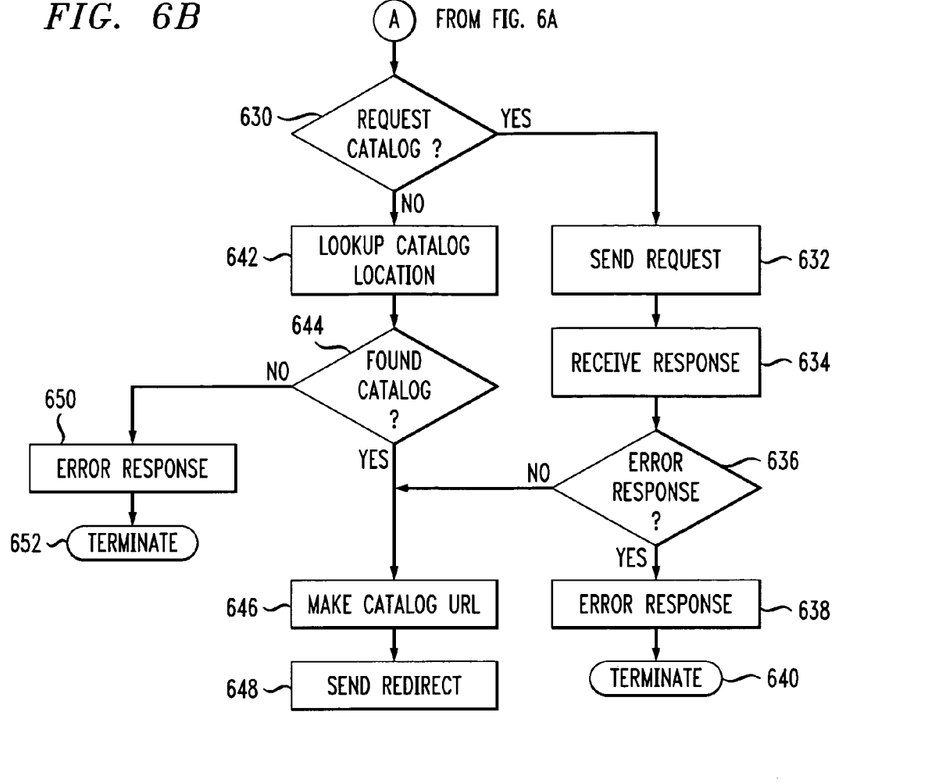

FIGS. 6A and 6B depict, by way of example only, a logical flow diagram illustrating a procedure 600 for handling a network catalog logon request performed by the B2B protocol exchange, in accordance with the present invention. With specific reference now to FIG. 6A, from a start state 602, the protocol exchange preferably receives a network catalog operations request from a buyer system in block 604. The request identifies, among other things, the identity of the buying system and the postback URL to which the shopping cart contents should be sent after the buyer has completed its shopping session. This information may be included within the request or the request may include a conversation identifier, as described above, which refers to identification information supplied by a previous request, such as, for example, the request initiated in block 502 of FIG. 5.

In block 606, the protocol exchange preferably determines whether the conversation identifier is present. If the conversation identifier is present, the protocol exchange can look up identification information in block 608 that was previously supplied (e.g., in block 502 of FIG. 5). In block 610, the protocol exchange preferably determines whether or not the identification information is present, for example in a local database or repository in which such information may be saved (e.g., block 506 in FIG. 5). If no identification information is found in block 610, an error response is returned to the buyer system in block 612 and the procedure 600 is then terminated 614.

If the identification information is found in block 610, the protocol exchange preferably attempts to identify the buyer system in block 616. It is to be appreciated that blocks 610 and 616 attempt to identify the buyer system. Either the buyer identification is provided in the request or the request includes a conversation identifier which refers to buyer identification provided in the same conversation (e.g., with the same conversation identifier). The buyer identification is preferably a user id or other identifier (e.g., data universal numbering system (DUNS) number), together with a password or other authentication information. If the buyer system cannot be identified, an error response is returned to the buyer system in block 618 and the procedure 600 is terminated. If the buyer system has been identified, the protocol exchange saves the postback URL (e.g., in memory included in the protocol exchange) in block 622. The postback URL is preferably used by the protocol exchange in one or more subsequent operations (e.g., block 704 in FIG. 7).

With continued reference to FIG. 6A, in block 624, the protocol exchange preferably determines a target information, including, for example, a target protocol, target credentials, etc. This target information may be stored in the protocol exchange itself, it may be sent as additional information in the network catalog operations request, or the target information may be determined by some combination of the two. In the preferred embodiment of the present invention, the target information is stored in a database maintained by the protocol exchange. Those skilled in the art will appreciate that this target information can also be sent in the request from the buying system by configuring it as additional information sent by the procurement system with the request.

After determining the target information, the protocol exchange preferably determines, in block 626, whether or not a conversation identifier is already present, or whether the protocol exchange must generate the conversation identifier. If no conversation identifier is present, the protocol exchange generates the conversation identifier in block 628. As previously stated, the conversation identifier is preferably used to identify a particular conversation when the shopping cart is returned (e.g., in block 702 in FIG. 7). For some protocols, the conversation identifier is embedded in the message containing the shopping cart. For those protocols that do not embed the conversation identifier in the message, the conversation identifier can be embedded in the postback URL. If the conversation identifier is present, block 628 may be omitted and the procedure 600 continues at block 630.

With reference now to FIG. 6B, once the conversation identifier is either found or generated, the protocol exchange determines, in block 630, whether the target protocol requires that a separate request be sent to the supplier system, for example, to determine the catalog location, identify the buyer system, identify the postback URL, accept a conversation identifier, etc. If the protocol exchange determines that the target protocol requires that a separate request must be made, such request is generated and sent to the supplier system in block 632. A response to this request from the supplier system is then preferably received by the protocol exchange in block 634. In block 636, the received response from the supplier system is checked to determine whether or not it is an error response. If the received response is an error response, an error message or response is then returned to the buyer system in block 638, and the procedure 600 then terminates at 640.

In block 630, if the target protocol does not require that a separate request be made to the supplier system, the protocol exchange looks up the catalog location in block 642. The catalog location information preferably resides in a database which is internal to the protocol exchange, although the present invention similarly contemplates that the catalog location information may be obtained from an external information source as well. If the protocol exchange cannot obtain the catalog location, as determined in block 644, either because the information is not available or is otherwise invalid, an error response is returned to the buyer system in block 650 and the procedure 600 then terminates at 652.

If the protocol exchange obtains the catalog location in block 644 or if no error response is received from the supplier system in block 636, a complete catalog URL, including the identification of the postback URL, is preferably created in block 646. The postback URL identifies a receiving point within the protocol exchange. In block 648, the protocol exchange then sends a redirect back to the buyer system browser to direct it to the supplier system catalog.

Figure 7:
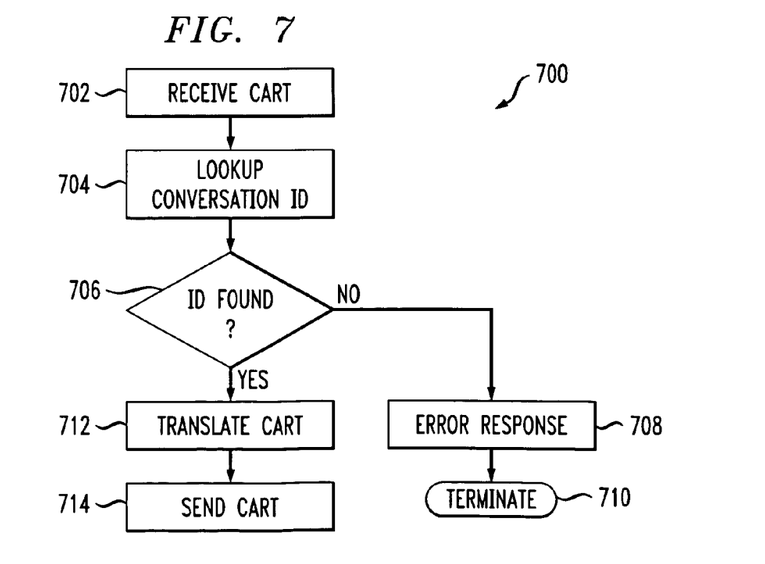
FIG. 7 is a logical flow diagram illustrating a shopping cart translation performed by the B2B protocol exchange of FIG. 4, in accordance with the present invention.

FIG. 7 depicts, by way of example only, a logical flow diagram illustrating a procedure 700 in which the B2B protocol exchange receives a shopping cart encoded in one protocol from the supplier system and translates the shopping cart into a different protocol used by the buyer system, in accordance with the present invention. In block 702, the buyer system preferably checks out any desired items for purchase in a shopping cart and the shopping cart is then sent to the postback URL, which is a location within the protocol exchange. The shopping cart in the illustrative procedure of FIG. 7 is encoded according to the supplier system protocol. Instead of immediately returning the shopping cart to the buyer system, some protocols may return a conversation identifier that will identify future asynchronous responses or is to be used in future requests relating to this conversation. The message received in block 702 preferably includes the conversation identifier that was either generated in block 506 of FIG. 5 or in block 628 of FIG. 6A, or received from the supplier system in block 634 of FIG. 6B.

After receiving the shopping cart from the supplier system, the protocol exchange preferably looks up the conversation identifier in the protocol exchange database in block 704. Associated with the conversation identifier is information relating to the conversation, including, for example, the protocol into which the shopping cart is to be translated as well as the original postback URL (e.g., saved in block 622 of FIG. 6A). After looking up the conversation identifier in block 704, the protocol exchange determines, in block 706, whether or not the conversation identifier exists in the protocol exchange database. If it does not exist, an error response is returned to the supplier system in block 708 and the procedure 700 then terminates at 710. If the conversation identifier is found, the protocol exchange translates the shopping cart in block 712 into the buyer system protocol and subsequently sends the translated shopping cart to the buyer system in block 714 at the postback URL retrieved in block 704.

It is to be appreciated that some messages in a conversation may require interaction with third parties, such as, for example, authentication servers, in order to perform a required transformation. Message responses from the supplier to the buyer in protocol B may be synchronous or asynchronous with respect to the corresponding message request(s) from the buyer to supplier. These message responses in protocol B may be transformed using data provided in a prior message of the conversation, into one or more messages of protocol A, which are sent either directly to the buyer, or to the buyer via the procurement system.

Figure 8:
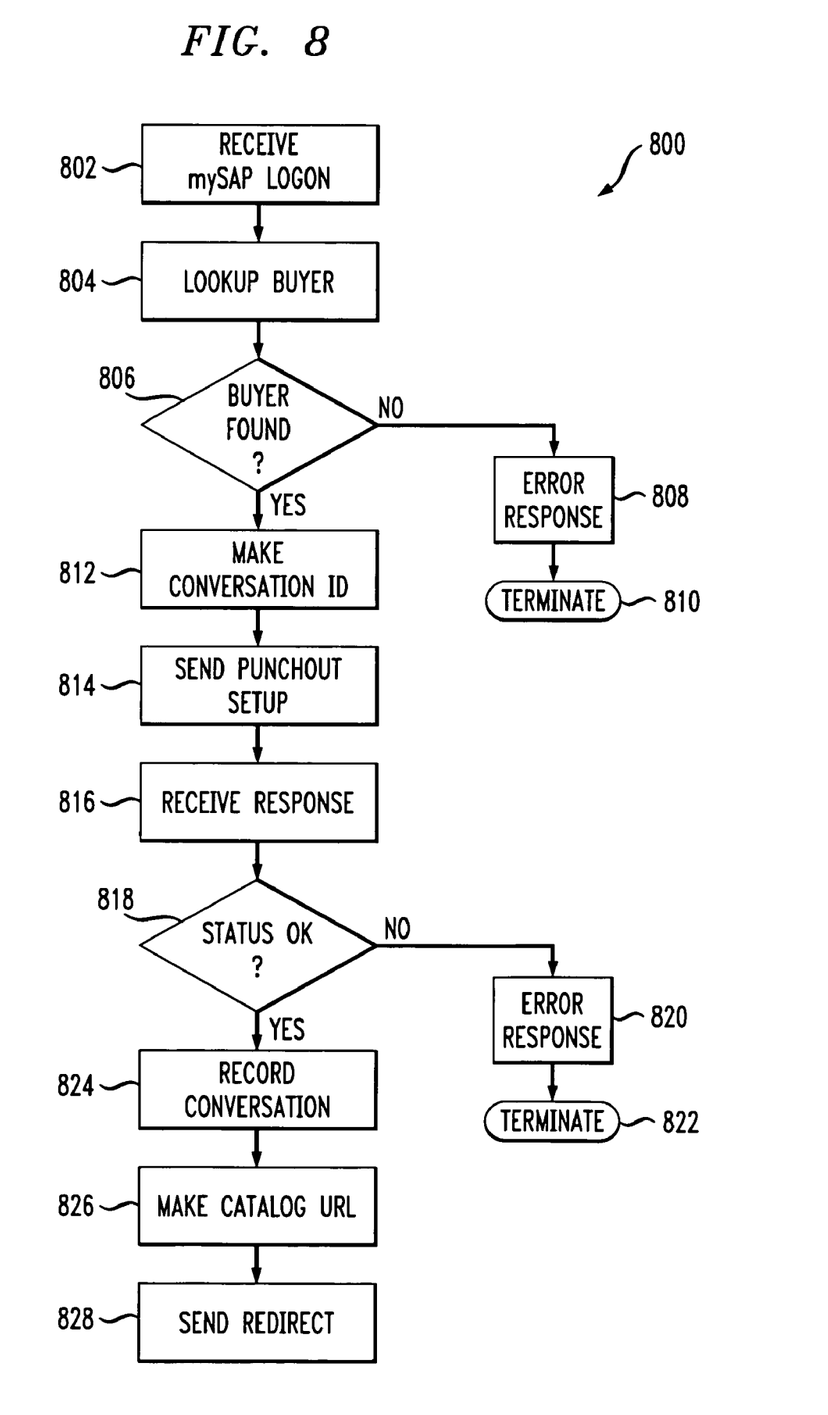
FIG. 8 is a logical flow diagram illustrating an exemplary transaction between a mySAP buyer system and an Ariba supplier system using the B2B protocol exchange, in accordance with the present invention.

Referring now to FIG. 8, a logical flow diagram is shown illustrating an example procedure 800 in which a mySAP buyer system communicates with an Ariba supplier system for catalog shopping via the B2B protocol exchange, in accordance with the present invention. In block 802, a mySAP logon request is received by the protocol exchange. This request may be analogous to the network catalog operations request received in block 604 of the illustrative procedure depicted in FIG. 6A. In block 804, the protocol exchange attempts to locate the buyer system identifier in its local database in a manner consistent with, for example, block 616 in FIG. 6A.

A determination as to whether or not the buyer system identifier is found is made in block 806. Block 806 checks to see if the buyer system is configured in a local database in the protocol exchange. The configuration information for the buyer, which is preferably stored in the local database in the protocol exchange, specifies, for example, that the target protocol is Ariba and supplies the URL of the Ariba purchasing system. If the buyer system identifier is not found, an error response is sent to the mySAP buyer system in block 808 (which is consistent with block 618 in FIG. 6A) and the procedure 800 then terminates at 810. If the buyer system identifier is found, the protocol exchange creates a conversation identifier in block 812 in a manner consistent with that of block 628 in FIG. 6A.

In block 814, the protocol exchange sends a Commerce XML (cXML) protocol punchout setup request to the Ariba supplier system. The punchout setup request includes, for example, the identity of the buyer system, the postback URL, and the conversation identifier, which in an Ariba cXML protocol is referred to as a buyer cookie. The protocol exchange receives a punchout setup response from the Ariba supplier system in block 816. The punchout setup response preferably includes the location of the supplier catalog, in a manner consistent with block 634 in FIG. 6B.

With continued reference to FIG. 8, after receiving the punchout setup response from the Ariba supplier, the protocol exchange checks the status in the punchout setup response in block 818 to determine whether it is normal or whether it is an error response. If the status of the punchout setup response is not normal, an error response is generated and sent to the mySAP buyer system in block 820 and the procedure 800 then terminates at 822. If the punchout setup response is determined to be normal (e.g., no error found), the protocol exchange procedure 800 continues to a subsequent processing block 824.

In block 824, the conversation identifier (e.g., generated in block 812) is preferably recorded in a local database in the protocol exchange for use in a subsequent operation. This record includes the conversation identifier, the identity of the buyer system, and the original postback URL from the initial mySAP logon request. The protocol exchange then creates, in block 826, a complete catalog URL, including the location of the supplier catalog, the conversation identifier and a postback URL that points to a location in the protocol exchange that is configured to receive a shopping cart in Ariba cXML format, in a manner consistent with that of block 646 in FIG. 6B. After creating the complete catalog URL, the protocol exchange sends a redirect message to the mySAP buyer's browser to connect it directly to the Ariba supplier system catalog.

Figure 9:
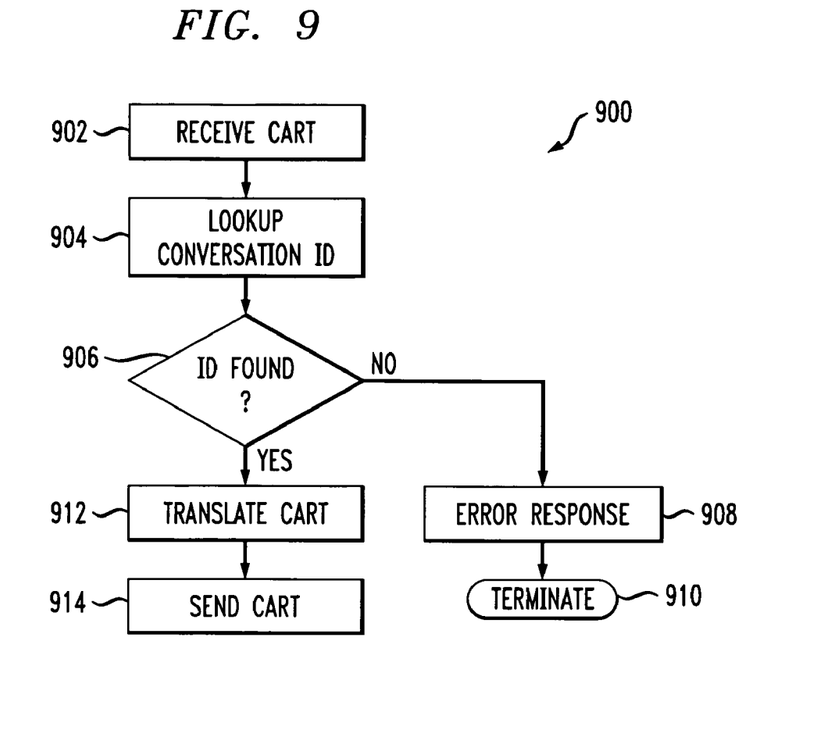
FIG. 9 is a logical flow diagram illustrating an exemplary shopping cart translation between an Ariba protocol and a mySAP HyperText Markup Language (HTML) protocol using the B2B protocol exchange, in accordance with the present invention.

FIG. 9 illustrates a logical flow diagram depicting an example procedure 900 in which a shopping cart generated by the illustrative shopping session of FIG. 8 is sent as an Ariba cXML message by the supplier system to the B2B protocol exchange, which translates the shopping cart into a mySAP HyperText Markup Language (HTML) protocol and transmits it to the mySAP buyer system, in accordance with another aspect of the invention. In the illustrative procedure 900, a mySAP buyer checks out one or more desired items for purchase and an Ariba cXML shopping cart is sent to the postback URL, which is a destination within the protocol exchange that is configured to accept shopping carts in Ariba cXML protocol. The shopping cart is received by the protocol exchange in block 902. This shopping cart preferably includes the conversation identifier (e.g., Ariba cXML buyer cookie) that was generated in block 812 of FIG. 8.

After receiving the shopping cart, the conversation identifier is looked up in a database or similar storage medium in the protocol exchange. As previously stated, associated with the conversation identifier is information about the conversation, including the target protocol into which the shopping cart is to be translated as well as the original postback URL (e.g., saved in block 824 of FIG. 8). In block 906, the protocol exchange determines whether or not the conversation identifier exists in the protocol exchange database. If it does not exist, an error response is generated and sent to the Ariba supplier system in block 908 and the procedure 900 then terminates at 910. If the conversation identifier is found, the shopping cart is translated from the Ariba cXML protocol to a mySAP HTML protocol by the protocol exchange in block 912. The shopping cart is then sent, in block 914, to the buyer system at the postback URL saved in block 824 and retrieved in block 904 in mySAP HTML protocol.

While a B2B framework employing the protocol exchange in accordance with the present invention is described herein with reference to a specific example of buyer and supplier protocols, those skilled in the art will readily appreciate that the B2B protocol exchange described herein can be used to map general stateful conversational processes as well.

Figure 10:
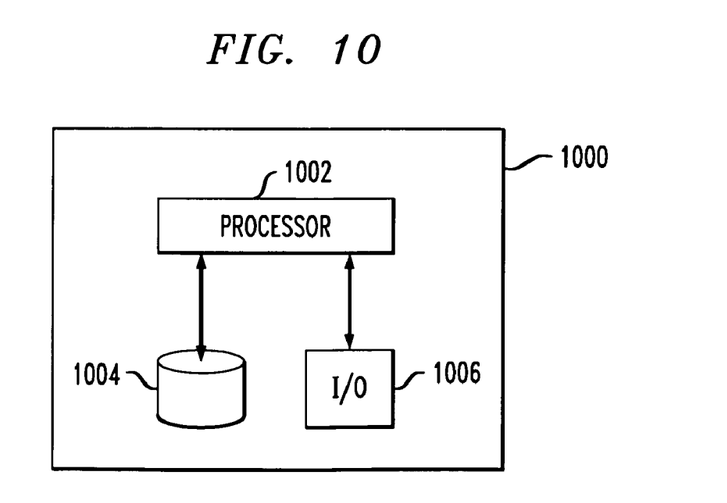
FIG. 10 is a block diagram illustrating a generalized data processing system architecture for implementing the methodologies of the present invention

Referring now to FIG. 10, a block diagram is shown illustrating a generalized hardware architecture of a computer or data processing system 1000 which is suitable for implementing the methodologies of the present invention, as depicted in the figures and described in detail herein. It is to be understood that these methodologies may be implemented on one or more such data processing systems.

With continued reference to FIG. 10, the B2B protocol exchange may be implemented in accordance with a processor 1002, a memory 1004 and at least one input/output (I/O) device 1006. It is to be appreciated that the term "processor" as used herein is intended to include any processing device (e.g., digital signal processor, microcontroller, etc.), for example, one that includes a central processing unit (CPU) and/or processing circuitry. The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc. In addition, the term "I/O devices" as used herein is intended to include, for instance, one or more input devices (e.g., mouse, keyboard, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, an application program, or software components thereof, including instructions or code for performing the methodologies of the invention, as described herein, may be stored in one or more of the associated memory devices (e.g., ROM, fixed or removable memory) and/or computer readable media and, when ready to be utilized, loaded in whole or in part (e.g., into RAM) and executed by a processor. In any case, it is to be appreciated that the B2B protocol exchange may be implemented in various forms of hardware, software, or combinations thereof.

It is to be appreciated that while the present invention has been described herein in the context of a data processing system, the methodologies of the present invention are capable of being distributed in the form of computer readable media, and that the present invention applies equally regardless of the particular type of signal-bearing media actually used to carry out the distribution. The term "computer readable media" as used herein is intended to include recordable-type media, such as, for example, a floppy disk, a hard disk drive, RAM, compact disk (CD) ROM, digital video disk (DVD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of communicating between two business entities, each of the business entities utilizing a different communication protocol, wherein a business conversation is established between the entities, the method comprising the steps of:

provideing a business-to-business (B2B) protocol exchange for facilitating communications between the business entities, the B2B protocol exchange being operatively connected to the business entities;

receiving, at the B2B protocol exchange, a message from one of the business entities in a first communication protocol;

translating the received message in the first communication protocol into a translated message in a second protocol used by another of the business entities; and sending the translated message to the other business entity;

wherein the step of sending the translated message to the other business entity further comprises the steps of:

generating, at the B2B protocol exchange, a conversation identifier associated with the business conversation; and the B2B protocol exchange inserting the conversation identifier into the translated message.

2. The method of claim 1, wherein the step of translating the received message is based on information included in one or more prior messages received by the B2B protocol exchange during the business conversation.

3. The method of claim 1, further comprising the step of:
storing information relating to the business conversation, the information being used for translating a subsequent message.

4. The method of claim 1, wherein the step of translating the received message further comprises the steps of:
determining a protocol of a target business entity; and
translating the received message into the target business entity protocol.

5. The method of claim 1, wherein the business entities are operatively connected to the protocol exchange via one or more networks.

6. A method of communicating between two business entities, each of the business entities utilizing a different communication protocol, wherein a business conversation is established between the entities, the method comprising the steps of:
providing a business-to-business (B2B) protocol exchange for facilitating communications between the business entities, the B2B protocol exchange being operatively connected to the business entities;
receiving, at the B2B protocol exchange, a message from one of the business entities in a first communication protocol;
translating the received message in the first communication protocol into a translated message in a second protocol used by another of the business entities; and
sending the translated message to the other business entity;
wherein the step of sending the translated message to the other business entity further comprises the steps of:
identifying, at the B2B protocol exchange, a postback universal resource locator (URL) associated with a target business entity; and
the B2B protocol exchange sending the translated message to the postback URL.

7. The method of claim 6, further comprising the step of:
storing the postback URL associated with the target business entity.

8. In a business-to-business (B2B) framework including a plurality of business entities, a protocol exchange operatively connected to the business entities, the protocol exchange comprising:
at least one processor operative to: (i) receive a message from one of the business entities in a first communication protocol; (ii) translate the received message in the first communication protocol into a translated message in a second protocol used by another of the business entities; and (iii) send the translated message to the other business entity; and
memory coupled to the at least one processor, which stores information relating to at least one of the business entities and a business conversation established between two or more business entities in the B2B framework;
wherein the at least one processor is further operative to: (iv) generate a conversation identifier associated with the business conversation; and (v) insert the conversation identifier into the translated message.

9. The protocol exchange of claim 8, wherein the operation of translating the received message is based on information included in one or more prior messages received by the protocol exchange during the business conversation.

10. The protocol exchange of claim 8, wherein the at least one processor is further operative to store information relating to the business conversation, the information being used for translating a subsequent message.

11. The protocol exchange of claim 8, wherein the at least one processor is further operative to: (iv) determine a protocol of a target business entity; and (v) translate the received message into the target business entity protocol.

12. In a business-to-business (B2B) framework including a plurality of business entities, a protocol exchange operatively connected to the business entities, the protocol exchange comprising:
at least one processor operative to: (i) receive a message from one of the business entities in a first communication protocol; (ii) translate the received message in the first communication protocol into a translated message in a second protocol used by another of the business entities; and (iii) send the translated message to the other business entity; and
memory coupled to the at least one processor, which stores information relating to at least one of the business entities and a business conversation established between two or more business entities in the B2B framework;
wherein the at least one processor is further operative to: (iv) identify a postback universal resource locator (URL) associated with a target business entity; and (v) send the translated message to the postback URL.

13. The protocol exchange of claim 12, wherein the at least one processor is further operative to: (vi) store the postback URL associated with the target business entity.

14. An article of manufacture for communicating between two business entities, each of the business entities utilizing a different communication protocol, wherein a business conversation is established between the entities, the article of manufacture comprising a computer readable medium storing one or more computer programs which when executed implement the steps of:
receiving a message from at least one of the business entities in a first communication protocol;
translating the received message in the first communication protocol into a translated message in a second protocol used by another of the business entities; and
sending the translated message to the other business entity;
wherein the step of sending the translated message to the other business entity further comprises the steps of:
generating a conversation identifier associated with the business conversation; and
inserting the conversation identifier into the translated message.

15. The article of claim 14, wherein the step of translating the received message is based on information included in one or more prior messages received during the business conversation.

16. The article of claim 14, further comprising the step of:
storing information relating to the business conversation, the information being used for translating a subsequent message.

17. The article of claim 14, wherein the step of translating the received message further comprises the steps of:
determining a protocol of a target business entity; and
translating the received message into the target business entity protocol.

18. An article of manufacture for communicating between two business entities, each of the business entities utilizing a different communication protocol, wherein a business conversation is established between the entities, the article of manufacture comprising a computer readable medium storing one or more computer programs which when executed implement the steps of:

receiving a message from at least one of the business entities in a first communication protocol;

translating the received message in the first communication protocol into a translated message in a second protocol used by another of the business entities; and sending the translated message to the other business entity;

wherein the step of sending the translated message to the other business entity further comprises the steps of:

identifying a postback universal resource locator (URL) associated with a target business entity; and sending the translated message to the postback URL.

19. The article of claim 18, further comprising the step of:

storing the postback UPI associated with the target business entity.

* * * * *

UNITED STATES PATENT AND TRADEMARK OFFICE
CERTIFICATE OF CORRECTION

PATENT NO. : 7,085,286 B2 Page 1 of 1
APPLICATION NO. : 09/896201
DATED : August 1, 2006
INVENTOR(S) : D.M. Dias et al.

It is certified that error appears in the above-identified patent and that said Letters Patent is hereby corrected as shown below:

In the Claims:

Claim 19, col. 16, line 9, delete "UPI" and insert --URL--.

Signed and Sealed this

Seventeenth Day of October, 2006

JON W. DUDAS
*Director of the United States Patent and Trademark Office*